United States Patent
Lee et al.

(10) Patent No.: US 9,857,258 B2
(45) Date of Patent: Jan. 2, 2018

(54) PRESSURE SENSOR TO SENSE MULTI-DIRECTIONAL MOVEMENT

(71) Applicant: Samsung Electro-Mechanics Co., Ltd., Suwon-si (KR)

(72) Inventors: Tae Hun Lee, Suwon-si (KR); Chang Hyun Lim, Suwon-si (KR); June Kyoo Lee, Suwon-si (KR); Dae Hun Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 103 days.

(21) Appl. No.: 14/933,043

(22) Filed: Nov. 5, 2015

(65) Prior Publication Data

US 2016/0273985 A1    Sep. 22, 2016

(30) Foreign Application Priority Data

Mar. 18, 2015 (KR) ........................ 10-2015-0037640

(51) Int. Cl.
  *G01L 9/06*   (2006.01)
  *G01L 9/00*   (2006.01)
  *G01L 19/06*   (2006.01)

(52) U.S. Cl.
  CPC ........ *G01L 9/0054* (2013.01); *G01L 19/0618* (2013.01)

(58) Field of Classification Search
  None
  See application file for complete search history.

(56) References Cited

U.S. PATENT DOCUMENTS

| 4,944,187 A | * | 7/1990 | Frick | G01L 9/0042 338/4 |
|---|---|---|---|---|
| 2014/0208859 A1 | * | 7/2014 | Miyashita | G01L 9/12 73/718 |
| 2015/0122039 A1 | * | 5/2015 | Brown | G01L 9/0045 73/721 |
| 2015/0192487 A1 | * | 7/2015 | Belov | B81C 1/00158 73/754 |
| 2015/0276533 A1 | * | 10/2015 | Belov | G01R 33/07 324/251 |

FOREIGN PATENT DOCUMENTS

JP        2005-337874 A     12/2005

* cited by examiner

*Primary Examiner* — Andre Allen
(74) *Attorney, Agent, or Firm* — NSIP Law

(57) ABSTRACT

A pressure sensor includes a sensor, an elastic support portion, a membrane, and a pressure detector. The sensor is accommodated in a frame of a base substrate. The elastic support portion is elastically connecting the sensor to the frame. The membrane is disposed on a surface of the sensor. The pressure detector is disposed on the membrane and configured to detect a variation in pressure based on a movement of the membrane.

20 Claims, 6 Drawing Sheets

PRESSURE SENSOR TO SENSE MULTI-DIRECTIONAL MOVEMENT

CROSS-REFERENCE TO RELATED APPLICATIONS

This application claims the priority and benefit under 35 USC 119(a) of Korean Patent Application No. 10-2015-0037640 filed on Mar. 18, 2015, with the Korean Intellectual Property Office, the disclosure of which is incorporated herein by reference.

BACKGROUND

1. Field

The following description relates to a pressure sensor manufactured using microelectromechanical system (MEMS) technology.

2. Description of Related Art

Along with the miniaturization of electronic products, electronic components installed therein continue to be miniaturized. As a result, subminiature sensors manufactured using microelectromechanical system (MEMS) technology are preferred as sensors that are widely used in mobile communications terminals.

Among various MEMS sensors, piezoresistive pressure sensors using piezoresistors are used as pressure sensors.

However, piezoresistive pressure sensors are sensitive to external forces applied to a membrane. Accordingly, even minute deformation of the membrane degrades a precision of the piezoresistive pressure sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a pressure sensor, including: a sensor accommodated in a frame of a base substrate; an elastic support portion elastically connecting the sensor to the frame; a membrane disposed on a surface of the sensor; and a pressure detector disposed on the membrane and configured to detect a variation in pressure based on a movement of the membrane.

The sensor may be spaced apart from an inner lateral surface of the frame.

The sensor may have a cavity formed in a surface of the sensor, and the membrane is disposed on the sensor to cover the cavity.

The elastic support portion may be formed in a shape of a plate spring and has one end connected to the sensor and the other end connected to the frame.

The elastic support portion may include a plate portion formed in a shape of a flat plate, and a pair of connection portions that extend from opposite ends of the plate portion and are connected to the sensor and the frame, respectively.

The elastic support portion may be a buffer between the sensor and the frame through an elastic force of the plate portion.

The connection portions may extend in a thickness direction of the plate portion from opposite ends of the plate portion, respectively, and distal ends of the connection portions are connected to the sensor and the frame, respectively.

The pressure sensor may also include a deformation detector disposed on the elastic support portion.

The deformation detector may include at least one piezoresistor.

The elastic support portion may include a plate portion formed in a shape of a flat plate, and a pair of connection portions that extend from opposite ends of the plate portion and are connected to the sensor and the frame, respectively; and the deformation detector may be formed on the plate portion to be adjacent to the connection portion connected to the frame.

The sensor may have a cavity formed on a surface of the sensor, the membrane is disposed on the sensor to cover the cavity, and a pressure detector is disposed on the membrane.

The elastic support portion may have one end connected to the frame and another end connected to the sensor in a form of a cantilever spring.

The deformation detector may be disposed at a portion of the elastic support portion that is deformed to a highest degree when the elastic support portion is elastically deformed.

The pressure sensor may also include a substrate including a surface adhered to a lower end of the frame.

The substrate and the sensor may have a space portion formed between the substrate and the sensor.

A lower surface of the frame may protrude farther downwardly than a lower surface of the sensor, and a distal end of a protruding portion of the frame is adhered to the substrate to form a space portion between the lower surface of the sensor and the substrate.

In accordance with an embodiment, there is provided a method to measure pressure, including: elastically connecting a sensor to a frame using an elastic support portion, wherein a membrane is disposed on a surface of the sensor and a deformation detector is disposed on the elastic support portion; detecting a variation in pressure based on a movement of the membrane using a pressure detector; acquiring a first output value output through the pressure detector; acquiring a second output value output through the deformation detector; and calculating a third output value as an output value corrected using the first output value and the second output value.

The second output value may be generated when the elastic support portion is deformed.

The third output value may be calculated by a difference between the first output value and the second output value.

Other features and aspects will be apparent from the following detailed description, the drawings, and the claims.

BRIEF DESCRIPTION OF THE DRAWINGS

The above and other aspects, features and advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
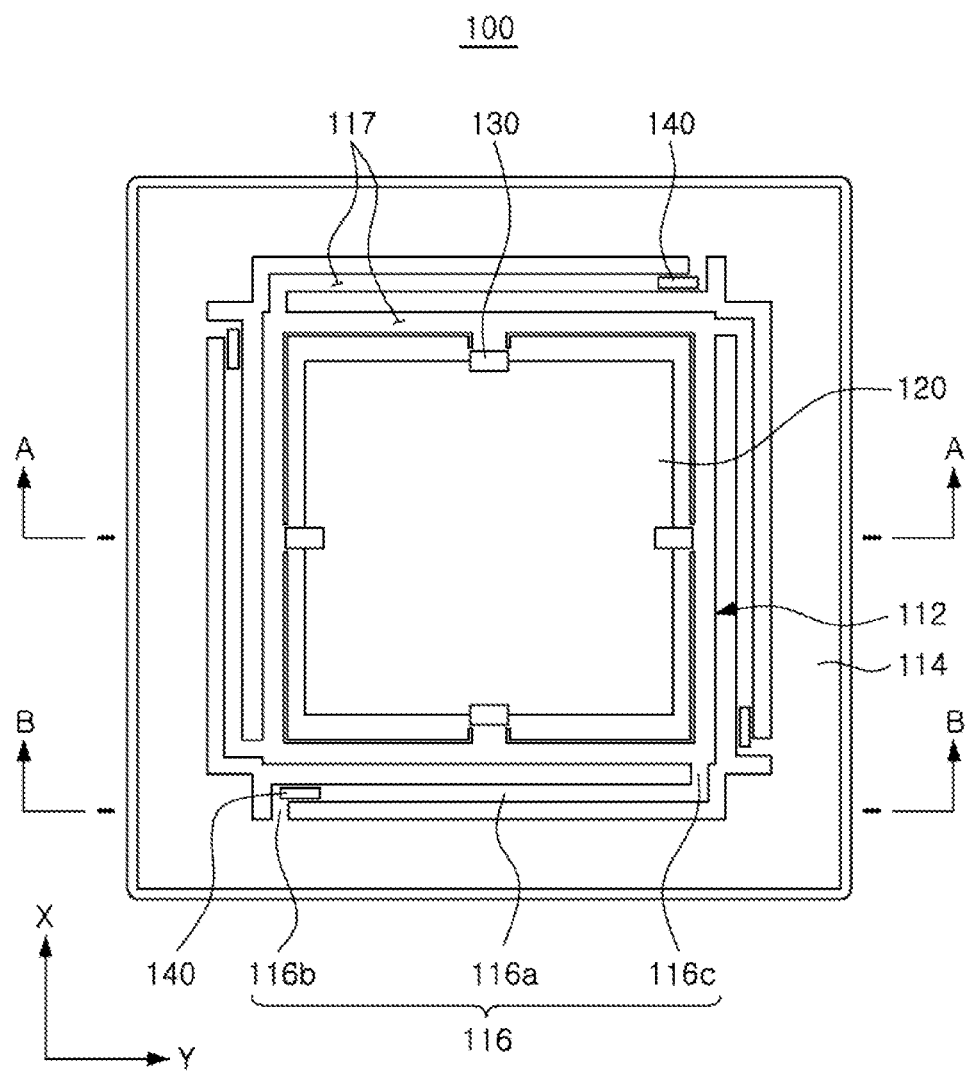
FIG. 1 is a schematic plan view of a pressure sensor, according to an embodiment.
Figure 2:
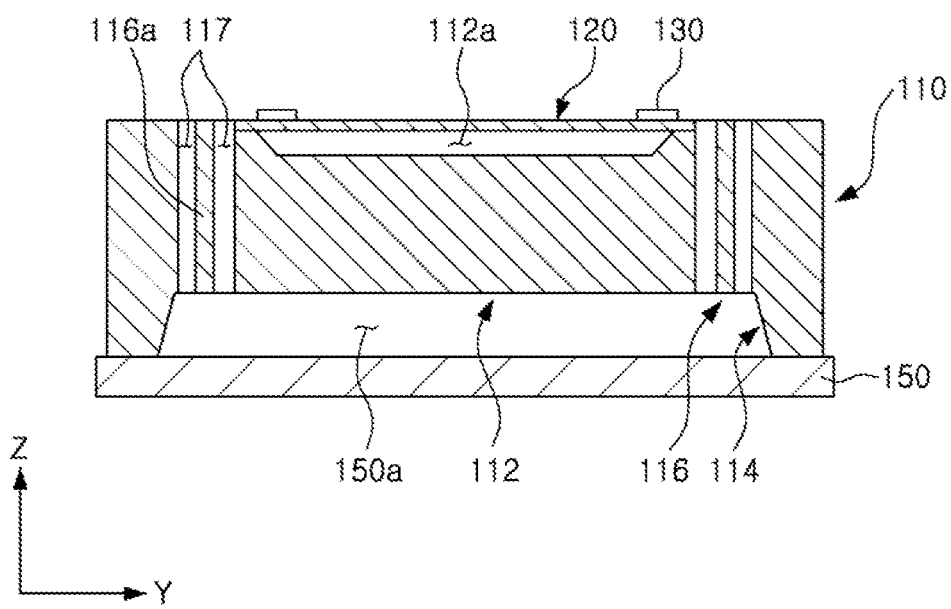
FIG. 2 is a schematic cross-sectional view of the pressure sensor taken along line A-A of FIG. 1.
Figure 3:
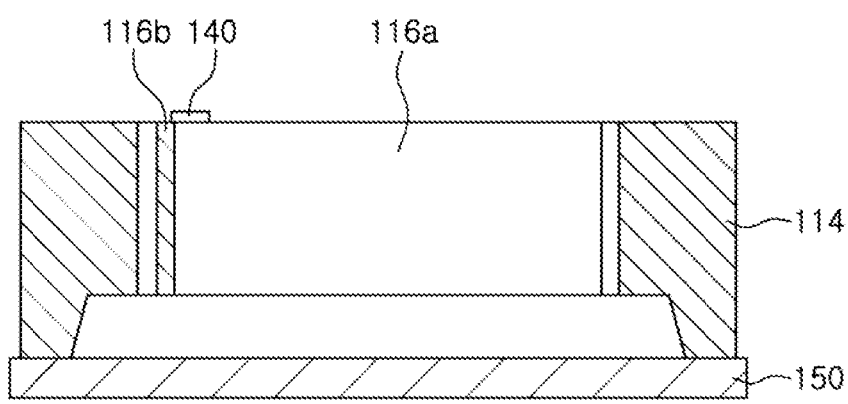
FIG. 3 is a schematic cross-sectional view of the pressure sensor taken along line B-B of FIG. 1.

FIG. 1 is a schematic plan view of a pressure sensor 100, according to an embodiment. FIG. 2 is a schematic cross-sectional view of the pressure sensor 100 taken along line A-A of FIG. 1. FIG. 3 is a schematic cross-sectional view of the pressure sensor 100 taken along line B-B of FIG. 1.

Referring to FIGS. 1 through 3, the pressure sensor 100, according to an embodiment, is formed by adhering a sensor chip, a semiconductor substrate such as a wafer, onto a flat substrate 150 as shown in FIGS. 2 and 3.

The substrate 150 is formed of, but is not limited to, glass or a silicon substrate.

The sensor chip includes a base substrate 110, a membrane 120 having a small thickness and formed on an upper surface of the base substrate 110, and a plurality of pressure detectors 130 formed on an upper surface of the membrane 120.

In the base substrate 110, a general silicon substrate is used as a semiconductor substrate. For example, the base substrate 110 is formed of monocrystalline silicon or silicon on insulator (SOI) material. In addition, the base substrate 110 is formed by stacking one or more silicon layers.

A cavity 112a is formed in the upper surface of the base substrate 110. In addition, a space portion 150a with a predetermined volume is formed in a lower surface of base substrate 110.

The membrane 120 is formed as a thin layer and is coupled to the base substrate 110 to cover and seal the cavity 112a on the upper surface of the base substrate 110. Accordingly, the cavity 112a is formed as a space sealed by the membrane 120.

The membrane 120, according to an embodiment, is a polysilicon layer or a silicon oxide layer or formed as stacked layers of the polysilicon layer or the silicon oxide layer, but is not limited thereto.

The pressure detector 130 includes a plurality of piezoresistors (or piezoresistive elements).

The pressure detector 130 is formed on an upper surface of the membrane 120. For example, the pressure detector 130 is positioned at a connection portion between the membrane 120 and the base substrate 110. In another example, the pressure detector 130 is positioned at a location in which the membrane 120, covering at least a portion of the cavity 112a, and the base substrate 110 at least partially overlap. Accordingly, when the membrane 120 vibrates due to external pressure, stress on the membrane 120 concentrates on the pressure detector 130, and a resistance value of the piezoresistor in the pressure detector 130 varies, thus, sensing and measuring pressure.

The pressure detector 130, according to an embodiment, may be a Wheatstone bridge circuit including four piezoresistors. Accordingly, when there is no motion in the membrane 120, the four piezoresistors have the same resistance value, and the pressure detector 130 outputs a voltage of 0V with respect to an input voltage, for example, 1.8V.

Conversely, when there is a motion in the membrane 120 due to a variation in surrounding pressure, a resistance value of at least one of the four piezoresistors is varied, and thus the pressure detector 130 outputs a value different from 0V as an output voltage. As a result, a variation in pressure is measured In addition, the base substrate 110, according to an embodiment, includes a sensor 112, a frame 114 disposed outside the sensor 112 and having a lower end coupled to the substrate 150, and an elastic support portion 116 for connection between the sensor 112 and the frame 114.

The sensor 112 is a portion in which the aforementioned cavity 112a is formed, and the membrane 120 and the pressure detector 130 are disposed on one surface of the sensor 112.

The frame 114 is disposed around the sensor 112 to surround the sensor 112. Accordingly, the sensor 112 is accommodated in an internal space of the frame 114.

In the embodiment, the sensor 112 is formed with an overall rectangular parallelepiped shape. Accordingly, the frame 114 is formed with an overall hollow rectangular parallelepiped shape. However, the frame 114 may be formed with different shapes such as rectangular shape.

As illustrated in FIG. 2, a lower surface of the frame 114 protrudes farther downwardly than a lower surface of the sensor 112, and a distal end of the protruding portion is adhered to the substrate 150. Accordingly, the space portion 150a is formed between the lower surface of the sensor 112 and the substrate 150.

The elastic support portion 116 connects the sensor 112 to the frame 114. More specifically, the elastic support portion 116 elastically supports the sensor 114. Accordingly, when shock is applied to the pressure sensor 100 due to an external force, the elastic support portion 116 relieves the shock via elastic force to significantly decrease direct application of the shock to the sensor 112.

The elastic support portion 116, according to an embodiment, is formed in a shape of a plate spring with one end fixed to the frame 114. For example, the elastic support portion 116 is formed as a cantilever spring.

One end of the elastic support portion 116 is connected to the frame 114, and the other end is connected to the sensor 112. In order to provide a clearance for the sensor 112 to move, a gap 117 is formed between the sensor 112 and the frame 114. The elastic support portion 116 is disposed in the gap 117.

The elastic support portion 116 includes a plate portion 116a disposed in parallel to the gap 117, and a pair of connection portions 116b and 116c that extend in a plane direction from opposing ends of the plate portion 116a and are connected to the sensor 112 and the frame 114, respectively.

The connection portions 116b and 116c extend in a thickness direction of the plate portion 116a from opposite ends of the plate portion 116a, respectively. In addition, distal ends of the connection portions 116b and 116c are connected to the sensor 112 and the frame 114, respectively.

Accordingly, the sensor 112 and the frame 114 are connected to opposite ends of the plate portion 116a, respectively. Thus, the elastic support portion 116 acts as a buffer between the sensor 112 and the frame 114 through an elastic force of the plate portion 116a.

The base substrate 110, according to the exemplary embodiment, is disposed in such a way that lateral surfaces of the sensor 112 and inner lateral surfaces of the frame 114 correspond to and oppose each other.

In addition, the two connection portions 116b and 116c disposed at the opposing ends of the plate portion 116a are connected to the lateral surfaces of the sensor 112 and the inner lateral surfaces of the frame 114, which oppose each other, respectively. In addition, four elastic support portions 116, according to an embodiment, are disposed to correspond to four lateral surfaces of the sensor 112. Accordingly, the four elastic support portions 116 are disposed on respective lateral surfaces of the sensor 112 so as to elastically support movement of the sensor 112 from every direction.

However, the pressure sensor 100, according to an embodiment, is not limited thereto, and various numbers of elastic support portions 116 may be included and arranged in various shapes in accord with the shape of the sensor 112 or the shape of the elastic support portion 116.

By virtue of the elastic support portion 116 configured above, the sensor 112 is elastically moved in X and Y directions. In addition, movement of the elastic support portion 116 in a Z direction may be limited.

At least one deformation detector 140 is formed on the elastic support portion 116, according to an embodiment.

The deformation detector 140 detects deformation of the elastic support portion 116. In one example, to detect the deformation, the deformation detector 140 uses a pressure resistor (or piezoresistor).

The deformation detector 140 is formed on one surface of the elastic support portion 116. In an embodiment, the deformation detector 140 is formed on the upper surface of the plate portion 116a of the elastic support portion 116. In addition, in each elastic support portion 116, one deformation detector 140 is disposed adjacent to the connection portion 116b to provide a connection between the plate portion 116a and the frame 114.

However, the elastic support portion 116 is not limited thereto, and the deformation detector 140 is disposed at any position of the elastic support portion 116 as long as the position is at a location that deforms due to deformation of the elastic support portion 116. For example, the deformation detector 140 is position at a portion of the elastic support portion 116 that deforms to a highest degree. In an alternative embodiment, a plurality of deformation detectors 140 are disposed on various locations of the elastic support portion 116.

Although not shown, a wiring pattern is formed in the base substrate 110. The wiring pattern electrically connects the pressure detector 130 and the deformation detector 140 or the substrate 150 to an external device, such as an internal base of a camera module, or an electrical device. Accordingly, the wiring pattern is formed along a surface of the base substrate 110.

The piezoresistive pressure sensor 100, according to an embodiment, is manufactured via a MEMS manufacturing process. However, the piezoresistive pressure sensor 100 is not limited thereto and may be manufactured through various processes, such as a semiconductor process.

In the piezoresistive pressure sensor 100, according to an embodiment, the elastic support portion 116 to provide a buffer effect is disposed between the sensor 112 and the frame 114 fixed to the substrate 150. Accordingly, in one illustrative example, only the frame 114 is fixedly adheres to the substrate 150. The sensor 112 is not fixed to the substrate 150 and is elastically supported through the elastic support portion 116 with one end fixed to the frame 114. However, in alternative embodiments, the frame 114 and other structural element may be fixed to the substrate 150.

Accordingly, even if deformation or shock occurs in the substrate 150 due to an external force, the deformation or the shock is not transferred directly to the sensor 112 and is relieved by the elastic support portion 116.

Accordingly, the sensor 112 may be significantly prevented from being damaged or the pressure sensitivity of the sensor 112 may be significantly prevented from being degraded due to deformation or shock.

In addition, the pressure sensor 100, according to an embodiment, enhances precision of pressure sensitivity through the deformation detector 140 disposed on the elastic support portion 116.

For example, when deformation, such as bending, occurs in the substrate 150, the frame 114 coupled to the substrate 150 is also deformed along with the substrate 150.

In this case, the sensor 112 is affected by the deformation. As a result, a resistance value of at least one of the pressure detectors 130 of the sensor 112 is varies, and an output voltage of the pressure sensor 100 also varies.

As such, when an output voltage of the pressure detector 130 varies due to deformation, it is difficult to distinguish voltage variation due to deformation from voltage that varies due to actual pressure variation. In particular, when deformation and pressure variation occur simultaneously, the sum of output voltage due to pressure variation and output voltage due to deformation is output instead of outputting only the output voltage due to pressure variation. Thus, precision in a measurement of pressure variation is degraded.

Accordingly, in order to overcome this, in the pressure sensor 100, according to an embodiment, the deformation detector 140 is disposed on the elastic support portion 116.

When the frame 114 is deformed, the elastic support portion 116 to provide a connection between the sensor 112 and the frame 114 is also deformed, which affects the deformation detector 140 disposed on the deformed elastic support portion 116 to also generate current in the corresponding deformation detector 140.

Accordingly, an error of the pressure detector 130 is compensated for based on the current generated in the deformation detector 140.

Hereinafter, a pressure measuring method, according to an embodiment, will be described with reference to FIG. 4 and Table 1 below.

Figure 4:
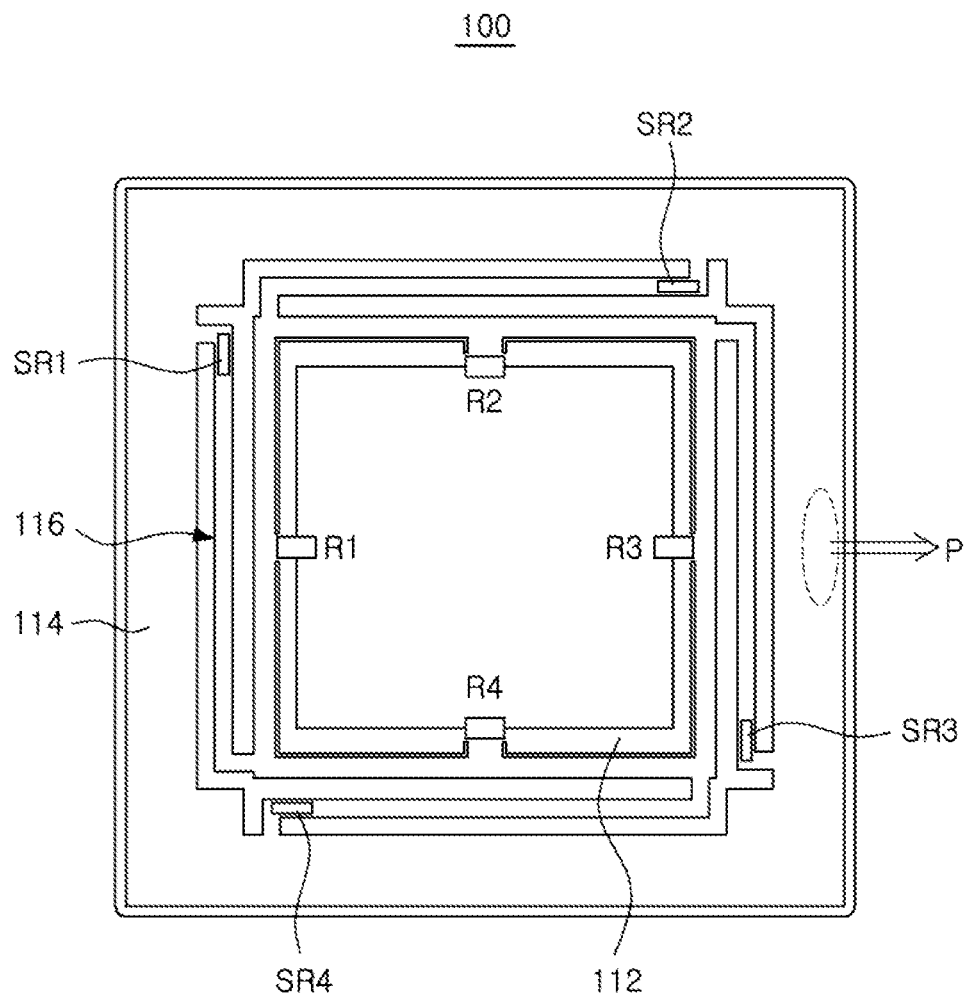
FIG. 4 is a plan view of the pressure sensor, according to an embodiment.

FIG. 4 is a plan view of the pressure sensor 100, according to an embodiment. The configuration illustrated in FIG. 4 is the same as FIG. 1, except that reference numerals of the pressure detector 130 and the deformation detector 140 are not shown in FIG. 4 for convenience of description.

In an embodiment, voltage applied to the pressure sensor 100 is 1.8V, and a resistance value before deformation of pressure detectors R1 to R4 and deformation detectors SR1 to SR4 is 5 kohm.

TABLE 1

| Division | Resistance Value before Deformation [kohm] | Resistance Value after Deformation [kohm] | Variance in Resistance Value [%] |
|---|---|---|---|
| R1 | 5 | 5.0000042 | 0.00008% |
| R2 | 5 | 4.9999788 | −0.00042% |
| R3 | 5 | 5.0000645 | 0.00129% |
| R4 | 5 | 5.0000154 | 0.00031% |
| SR3 | 5 | 5.025 | 0.50% |
| SR1 | 5 | 5.01 | 0.20% |
| SR2 | 5 | 5.015 | 0.30% |
| SR4 | 5 | 5.005 | 0.10% |

Referring to FIG. 4 and Table 1 above, when there is no pressure variation, the pressure detectors R1 to R4 have a constant resistance value, such as 5 kohm. Because there is no pressure variation, an output value of the pressure sensor 100, indicating pressure variation, is 0V.

In this case, there is no variation in the deformation detectors SR1 to SR4. Thus, the deformation detectors SR1 to SR4 also have a constant resistance value, such as 5 kohm.

As shown in FIG. 4, when an external force is applied to the pressure sensor 100 in a P direction to deform the pressure sensor 100, resistance values of the pressure detectors R1 to R4 vary, as shown in Table 1. As shown in Table 1, resistance values are measured after a portion of a frame is deformed to 5 μm in a P direction, without pressure variation.

In this case, the pressure sensor 100 outputs a value, such as a first output value, of −6.700469 μV but not 0V due to variation in a resistance value of the pressure detectors R1 to R4. In one example, the first output value is calculated according to Equation 2, as presented below.

Accordingly, although pressure is not actually varied, an output value of the pressure sensor 100 is generated due to deformation of the pressure sensor 100 which indicates that pressure variation generates from an external source. Accordingly, the output value is an error.

However, when the deformation detectors SR1 to SR4, according to an embodiment, are used, the error is significantly reduced through the embodiments described herein and corresponding manufacturing methods.

When the pressure sensor 100 is deformed, the elastic support portion 116 is also deformed. Accordingly, resistance values of the deformation detectors SR1 to SR4 disposed on the elastic support portion 116 are also varied, as shown in Table 1.

Accordingly, a corrected output value is calculated using variation in resistance values of the pressure detectors R1 to R4 and variation in resistance values of the deformation detectors SR1 to SR4.

For example, a third output voltage V3, as a corrected output value, is calculated according to Equation 1 below.

$$V3 = V1 - V2 \quad \text{(Equation 1)}$$

In one example, V1 is an output value (hereinafter referred to as a "first output value") output based on variation in resistance values in the pressure detectors R1 to R4, and V2 is an output value (hereinafter referred to as "a second output value") output based on variation in resistance values in the deformation detectors SR1 to SR4.

The corrected third output value V3 is calculated by a difference between the first output value V1 and the second output value V2.

V1 and V2 may be calculated according to Equations 2 and 3 below.

$$V1 = Vs(R2/(R1+R2) - R3(R3+R4)) \quad \text{(Equation 2)}$$

$$V2 = Vs(R2'/(R1'+R2') - R3'(R3'+R4')) \quad \text{(Equation 3)}$$

In one example, Vs is an input voltage of the pressure sensor 100, and in an embodiment, 1.8V is applied as described above.

In addition, in Equation 3, R1', R2', R3', and R4' are deformation resistance values calculated based on resistance values of the deformation detectors SR1 to SR4. In the case of the deformation detectors SR1 to SR4, all resistance values are organically varied.

Accordingly, resistance values of the deformation detectors SR1 to SR4 are combined to calculate and use R1', R2', R3', and R4'. In addition, Equation 3 above is provided assuming that R1', R2', R3', and R4' constitute a Wheatstone bridge circuit.

R1', R2', R3', and R4' are calculated according to Equation 4 below.

$$R1' = \alpha SR1 + \beta SR2 + \gamma SR4$$

$$R2' = \alpha SR2 + \beta SR3 + \gamma SR1$$

$$R3' = \alpha SR3 + \beta SR4 + \gamma SR2$$

$$R4' = \alpha SR4 + \beta SR1 + \gamma SR3 \quad \text{(Equation 4)}$$

In one example, R1' are resistance values of the deformation detectors SR1 to SR4 when SR1 is deformed to a highest degree. In this case, assuming that SR3, which is disposed furthest from SR1, is barely deformed, any resistance value associated with SR3 is omitted. Such assumption is also applied to R2', R3', and R4' in the same manner.

In Equation 4 above, α, β, and γ each is a constant and are used to compensate for a difference according to an arrangement interval or positions between the deformation detectors SR1 to SR4.

α, β, and γ are calculated via repetitive measurement and are modified according to arrangement positions of the deformation detectors SR1 to SR4 or a shape of the elastic support portion 116.

When Equations 4 and 3 are applied based on the resistance values of the deformation detectors SR1 to SR4 shown in Table 1, the second output value V2 is calculated as −6.708858 uV.

In one example, the second output value V2 is calculated by inserting −0.000145 as α, 0.000068 as β, and 0.00001 as γ.

The calculated second output value V2 refers to variation in voltage generated due to deformation when a portion of the frame 114 is deformed to 5 μm in a P direction.

Accordingly, when the calculated V1 and V2 are inserted to Equation 1, the corrected output value is 0.0083898 uV. Accordingly, even if there is no pressure change, an error is significantly reduced, compared to a case in which −6.700469 uV is used as the output V1 for pressure calculation without changes.

As described above, when a pressure sensor excludes the elastic support portion 116 and the deformation detector 140, according to an embodiment, the pressure sensor only measures V1 as a value output based on variation in resistance value generated in the pressure detectors R1 to R4. Accordingly, it is impossible to compensate for error.

However, the pressure sensor 100, according to an embodiment, compensates for error using the elastic support portion 116 and the deformation detector 140. Accordingly, more precise pressure voltage is provided.

The pressure sensor, according to an embodiment, is not limited to the aforementioned embodiments and may be changed in various ways.

Figure 5:
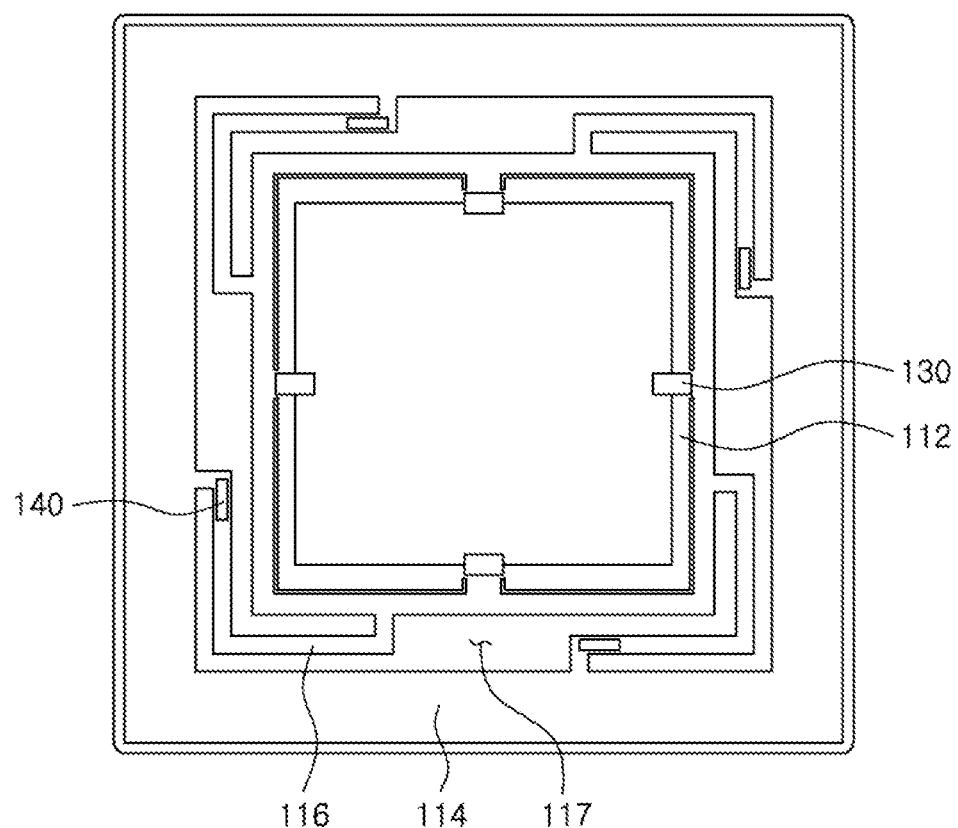
FIGS. 5 and 6 are schematic plan views of a pressure sensor, according to other embodiments.
Figure 6:
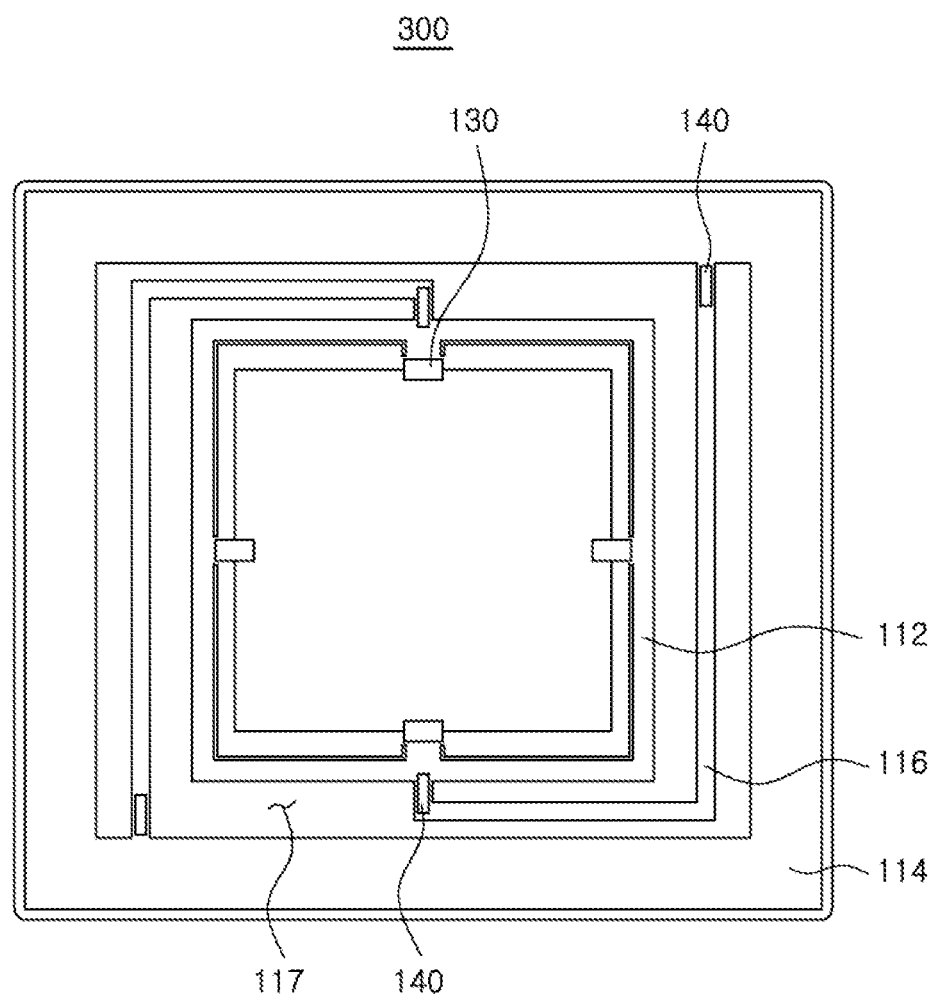

FIGS. 5 and 6 are schematic cross-sectional views of a pressure sensor, according to alternative embodiments.

Referring to FIG. 5, a pressure sensor 200, according to another embodiment, is different from the pressure sensor 100 in terms of a shape of the elastic support portion 116 and a connection structure.

The elastic support portion 116, according to an embodiment, is disposed to wind corner portions of the sensor 112. As a result, both ends of the elastic support portion 116 are disposed on different lateral surfaces of the sensor 112.

In addition, a pressure sensor 300, as illustrated in FIG. 6, includes two elastic support portions 116. Further, a distance between a lateral surface of the sensor 112, to which the elastic support portion 116 is not connected, and an inner lateral surface of the frame 114, is wider than a portion connected to the elastic support portion 116.

Figure 7:
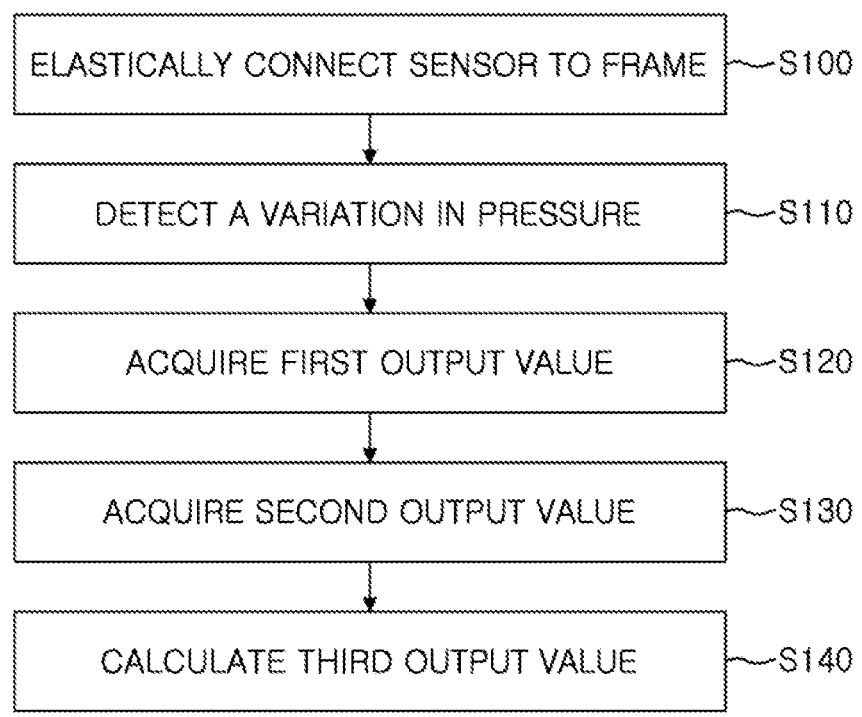
FIG. 7 illustrates a method to measure pressure using the pressure sensor, in accordance with an embodiment.

As illustrated in FIG. 7, a method to measure pressure, in accordance with an embodiment, includes at operation S100, elastically connecting a sensor to a frame using an elastic support portion, wherein a membrane is disposed on a surface of the sensor and a deformation detector is disposed on the elastic support portion. At operation S110, the method detects a variation in pressure based on a movement of the membrane using a pressure detector. At operation S120, the method acquires a first output value output through the pressure detector. At operation S130, the method acquires a second output value output through the deformation detector. At operation S140, the method calculates a third output value as an output value corrected using the first output value and the second output value.

As set forth above, according to various embodiments, a pressure sensor is configured in such a way that a sensor is elastically supported by an elastic support portion. Accordingly, even if deformation or shock occurs in a substrate due to external force, the deformation or shock is not transferred directly to the sensor and is relieved by the elastic support portion. Thus, the sensor is not damaged or the pressure sensitivity of the sensor is not degraded due to the deformation or shock.

The pressure sensor, according to various embodiments, enhances precision of pressure sensitivity through a deformation detector disposed on the elastic support portion.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A pressure sensor, comprising:
   a sensor accommodated in a frame of a base substrate;
   an elastic support portion elastically connecting the sensor to the frame and configured to provide multidirectional movement to the sensor;
   a membrane disposed on a surface of the sensor; and
   a pressure detector disposed on the membrane and configured to detect a variation in pressure based on a movement of the membrane.

2. The pressure sensor of claim 1, wherein the sensor is spaced apart from an inner lateral surface of the frame.

3. The pressure sensor of claim 1, wherein the sensor has a cavity formed in a surface of the sensor, and the membrane is disposed on the sensor to cover the cavity.

4. The pressure sensor of claim 1, wherein the elastic support portion is formed in a shape of a plate spring and has one end connected to the sensor and the other end connected to the frame.

5. The pressure sensor of claim 4, wherein the elastic support portion comprises a plate portion formed in a shape of a flat plate, and a pair of connection portions that extend from opposite ends of the plate portion and are connected to the sensor and the frame, respectively.

6. The pressure sensor of claim 5, wherein the elastic support portion is a buffer between the sensor and the frame through an elastic force of the plate portion.

7. The pressure sensor of claim 5, wherein the connection portions extend in a thickness direction of the plate portion from opposite ends of the plate portion, respectively, and distal ends of the connection portions are connected to the sensor and the frame, respectively.

8. The pressure sensor of claim 1, further comprising:
   a deformation detector disposed on the elastic support portion.

9. The pressure sensor of claim 8, wherein the deformation detector includes at least one piezoresistor.

10. The pressure sensor of claim 8, wherein the elastic support portion comprises a plate portion formed in a shape of a flat plate, and a pair of connection portions that extend from opposite ends of the plate portion and are connected to the sensor and the frame, respectively; and
   the deformation detector is formed on the plate portion to be adjacent to the connection portion connected to the frame.

11. The pressure sensor of claim 8, wherein the sensor has a cavity formed on a surface of the sensor, the membrane is disposed on the sensor to cover the cavity, and a pressure detector is disposed on the membrane.

12. The pressure sensor of claim 1, wherein the elastic support portion has one end connected to the frame and another end connected to the sensor in a form of a cantilever spring.

13. The pressure sensor of claim 8, wherein the deformation detector is disposed at a portion of the elastic support portion that is deformed to a highest degree when the elastic support portion is elastically deformed.

14. The pressure sensor of claim 1, further comprising:
a substrate comprising a surface adhered to a lower end of the frame.

15. The pressure sensor of claim 14, wherein the substrate and the sensor have a space portion formed between the substrate and the sensor.

16. The pressure sensor of claim 15, wherein a lower surface of the frame protrudes farther downwardly than a lower surface of the sensor, and a distal end of a protruding portion of the frame is adhered to the substrate to form a space portion between the lower surface of the sensor and the substrate.

17. A method to measure pressure, comprising:
elastically connecting a sensor to a frame using an elastic support portion, the elastic support portion configured to provide multidirectional movement to the sensor, wherein a membrane is disposed on a surface of the sensor and a deformation detector is disposed on the elastic support portion;
detecting a variation in pressure based on a movement of the membrane using a pressure detector;
acquiring a first output value output through the pressure detector;
acquiring a second output value output through the deformation detector; and
calculating a third output value as an output value corrected using the first output value and the second output value.

18. The method of claim 17, wherein the second output value is generated when the elastic support portion is deformed.

19. The method of claim 17, wherein the third output value is calculated by a difference between the first output value and the second output value.

20. The pressure sensor of claim 1, wherein the multidirectional support includes X-Y directions.

* * * * *